(12) United States Patent
Côte

(10) Patent No.: US 6,937,800 B2
(45) Date of Patent: Aug. 30, 2005

(54) ADJUSTABLE POSITIONING MECHANISM

(75) Inventor: Nicolas Côte, St-Augustin (CA)

(73) Assignee: Teraxion Inc., Sainte-Foy (CA)

( * ) Notice: Subject to any disclaimer, the term of this patent is extended or adjusted under 35 U.S.C. 154(b) by 2 days.

(21) Appl. No.: 10/762,212

(22) Filed: Jan. 21, 2004

(65) Prior Publication Data

US 2004/0165830 A1 Aug. 26, 2004

Related U.S. Application Data

(60) Provisional application No. 60/441,477, filed on Jan. 22, 2003.

(51) Int. Cl.[7] .............................. G02B 6/26; G02B 6/00
(52) U.S. Cl. .......................... 385/52; 385/147; 359/896
(58) Field of Search ..................... 385/50–52, 134–139, 385/147; 359/896, 849; 356/301

(56) References Cited

U.S. PATENT DOCUMENTS

| | | | |
|---|---|---|---|
| 4,753,510 A | 6/1988 | Sezerman | 350/96.21 |
| 4,880,301 A * | 11/1989 | Gross | 356/636 |
| 4,889,406 A | 12/1989 | Sezerman | 350/96.21 |
| 5,095,517 A | 3/1992 | Monguzzi et al. | 385/80 |
| 5,703,683 A * | 12/1997 | Hunt et al. | 356/301 |
| 6,198,580 B1 | 3/2001 | Dallakian | 359/822 |
| 6,384,993 B1 * | 5/2002 | Bell et al. | 359/896 |
| 6,519,101 B2 * | 2/2003 | Bell et al. | 359/896 |
| 2002/0075581 A1 * | 6/2002 | Bell et al. | 359/896 |

* cited by examiner

Primary Examiner—Akm Enayet Ullah
(74) Attorney, Agent, or Firm—Fogg and Associates, LLC; Laura A. Ryan

(57) ABSTRACT

An adjustable positioning mechanism for positioning an optical element relatively to a second element is provided. The adjustable positioning mechanism comprises a reference plate having a predetermined shaped socket providing a reference mating surface, and a mobile member for holding the optical element. The mobile member has a shaped mating portion at least part of which is defined by a spherical surface adapted for fitting into the reference plate socket and abutting against the reference mating surface, thereby providing a pivot type of joint between the reference plate and the mobile member. The adjustable positioning mechanism is also provided with a deformable maintaining element connected to the mobile member acting against the reference plate and adapted to rotatively hold the mobile member and the reference plate together in cooperation with the pivot joint. The adjustable positioning mechanism is also provided with a releasable non-deformable securing element connected to the mobile member frictionally acting against the reference plate for rigidly securing the mobile member and the reference plate together when the securing element is in a locked position. The adjustable positioning mechanism also comprises non-deformable tilt adjustment means connected to the mobile member and pressing against the reference plate for providing a controlled angular movement of the mobile member relative to the reference plate when the securing element is in an unlocked position.

22 Claims, 4 Drawing Sheets

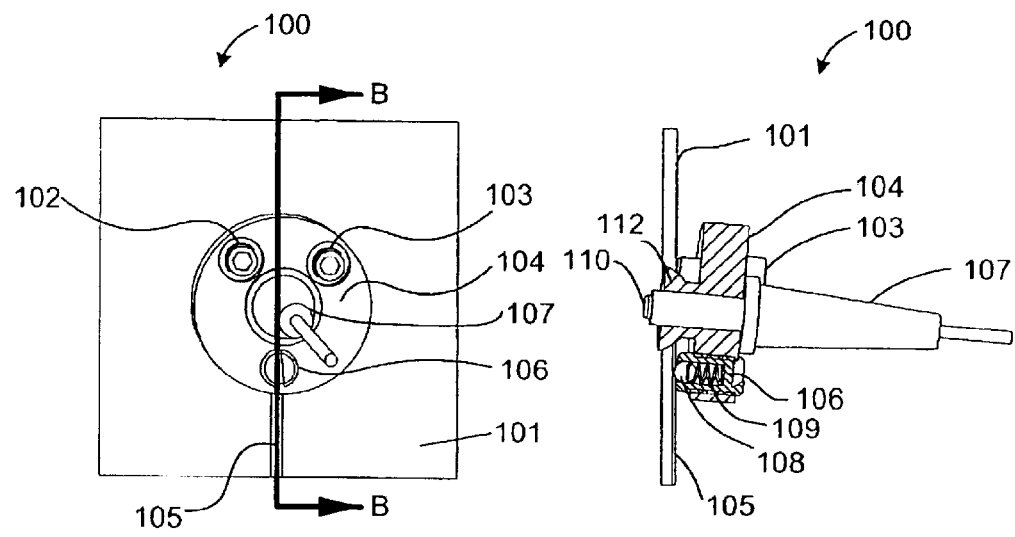
Figure 5
Figure 5A
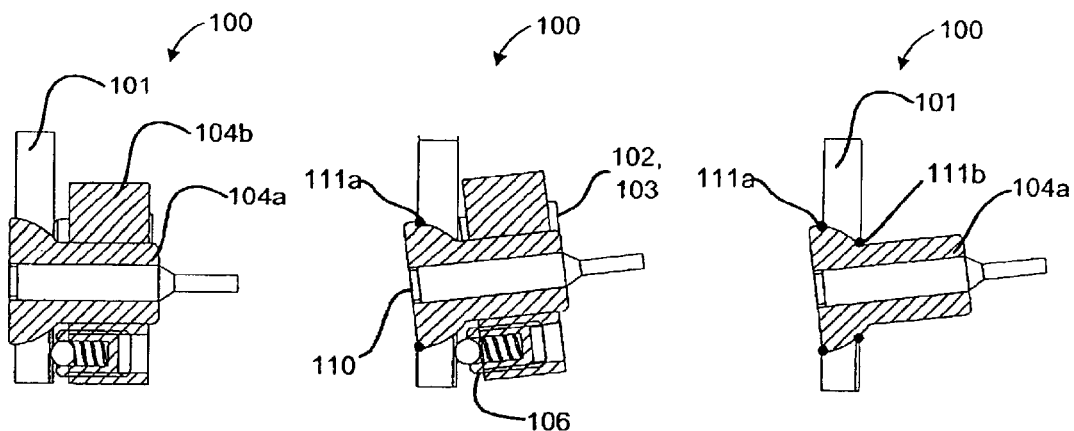
Figure 6A
Figure 6B
Figure 6C

ADJUSTABLE POSITIONING MECHANISM

CROSS REFERENCE TO RELATED APPLICATIONS

This application is related to and claims the benefit of the filing date of co-pending provisional application Ser. No. 60/441,477 (the "'477 application"), filed on Jan. 22, 2003. The '477 application is incorporated by reference.

FIELD OF THE INVENTION

This invention generally relates to the positioning of an optical assembly or sub-assembly, and more particularly to the displacement and adjustment of an optical assembly or sub-assembly relatively to another.

BACKGROUND OF THE INVENTION

For the past years, a number of adjustable positioning mechanism have been developed for positioning an optical assembly relatively to another.

For example, U.S. Pat. Nos. 4,753,510 and 4,889,406, both issued to Sezerman, describe an adjustable optical connection between two optical fibers. The preferred embodiment disclosed in these patents is an optical assembly fixed within a flange. By using fine pitch screws, such a flange may be connected and then adjusted relatively to a fixed member, which may be another flange containing another optical assembly. A resilient member, which is disposed between the plates, acts as a spring load during the tilt adjustment. One problem associated with such configuration is that the tilt axes are not fixed during the adjustment, since the resilient member is allowed to deform randomly. Therefore, in addition to a rotation of the mobile flange from the reference plate, undesirable and uncontrolled displacement in the other degrees of freedom may occur. Sezerman solved this problem in describing an alternate embodiment using a solid fulcrum instead of a resilient material. In this configuration, the adjustment screws circumferentially spaced would provide a controlled rotation around a fix and solid point. This mechanism would basically work as a "ball and socket" type of joint. This system, having 3 or more adjustment screws, requires the simultaneous operation of 2 or more screws to pivot the assembly about an axis. This complexifies the alignment procedure of the mechanism and makes it less intuitive to use. Another feature of the Sezerman mechanism is that it has to get resilient material inserted between the screws and the mobile member. That causes the assembly to be non-stabilized. It is understood that the assembly position equilibrium is dependent on the counterbalance of the load in the resilient material and the load in the metallic parts, such as the screws and the fulcrum. External forces applied on the optical components aligned by this mechanism will therefore likely result in misalignment of the system. Furthermore, given that the mechanical properties of the resilient material can and will likely change in time, this may also lead to changes in the equilibrium conditions and misalignment of the mechanism. This problem is also present in the preferred embodiments described in Sezerman patents. Another aspect of these inventions is that although they provide compact adjustment mechanisms, they are not readily suited to provide for hermetic attachment of the adjusted optical component to a wall or optoelectronic package such as those used for telecommunication systems.

U.S. Pat. No. 5,095,517 issued to Monguzzi and al. proposed an optical connector with a housing receiving a movable component having a spherically shaped surface portion in which the optical element is inserted. The spherical surface of the mobile element is in contact with a mating surface on the fixed member and allows rotation. Once the optimal position is achieved, tightening elements are used to create and maintain enough friction force on the spherical joint to lock the mobile part and prevent further rotation. The assembly therefore do not rely on resilient materials to maintain its position. However, the position is still not rigidly locked and external forces of sufficient magnitude can counterbalance the friction force and misalign the mechanism. Furthermore, the proposed connector does not contain its own alignment mechanism such as alignment screws and therefore such assembly requires external manipulators to be aligned and cannot be used in a stand alone configuration.

The invention developed by Dallakian and shown in U.S. Pat. No. 6,198,580 relates to an optical mount using a spherical bearing surface. The mechanism uses 2 independent and perpendicular adjustment pivots. The mobile part and the fixed element are mated and maintained together using spring tensionners. The assembly is then tilted by tightening or loosening the adjustment screws and the equilibrium of the assembly is created by balancing the tension load in the springs and the compression load in the screws. Given that no locking mechanism is featured in this system, the alignment of the optical mount can easily be modified by external forces and therefore this invention is confined to laboratory use only and cannot be assigned to be part of an optoelectronic module.

Therefore, there is still a need for an adjustable positioning mechanism overcoming the disadvantages of the devices discussed above. Moreover, it would be desirable to provide an adjustable positioning mechanism easily manufacturable for a commercial use, that can be compact, easily adjusted, rigidly locked in place, and that prevents any movement that could occur from spring fatigue and/or resilient material or the influence of an external force while providing potential hermetic sealing.

SUMMARY OF THE INVENTION

An object of the present invention is to provide an adjustable positioning mechanism which satisfies the above-mentioned needs.

Accordingly, the present invention provides an adjustable positioning mechanism for positioning an optical element relatively to a second element. The adjustable positioning mechanism is provided with a reference plate having a predetermined shaped socket providing a reference mating surface. The positioning mechanism is also provided with a mobile member for holding the optical element. The mobile member has a shaped mating portion at least part of which is defined by a spherical surface adapted for fitting into the shaped socket of the reference plate and abutting against the reference mating surface, thereby providing a pivot type of joint between the reference plate and the mobile member. The positioning mechanism also comprises a deformable maintaining element connected to said mobile member acting against the reference plate and adapted to rotatively hold the mobile member and the reference plate together in cooperation with the pivot type of joint. The positioning mechanism also comprises a releasable non-deformable securing element connected to said mobile member frictionally acting against the reference plate for rigidly securing the mobile member and the reference plate together when the securing element is in a locked position. The positioning mechanism is also provided with non-deformable tilt adjustment means connected to the mobile member and pressing against the reference plate. The tilt adjustment means provides a controlled angular movement of the mobile member relative to the reference plate when the securing element is in an unlocked position.

In a preferred embodiment, the reference mating surface comprises a spherical supporting portion.

In a further preferred embodiment, the shaped socket of the reference plate is an opening, the mobile member extending through the reference plate. The mating surface of the reference plate extends on a first side of the reference plate, while the maintaining element, the securing element and the tilt adjustment means extend on a second side opposed to the first.

A further object of the present invention is to provide a true hermetic sealable adjustable positioning mechanism.

Accordingly, in one embodiment of the invention, the adjustable positioning mechanism is further provided with sealing means for hermetically sealing the reference plate and the mobile member together when the securing element is in the locked position.

In another embodiment of the present invention, the maintaining element, the securing element and the tilt adjustment means are removable once the mobile member has been sealed to the reference plate in the desired position for providing a more compact mechanism.

BRIEF DESCRIPTION OF THE DRAWINGS

These and other objects and advantages of the invention will become apparent upon reading the detailed description and upon referring to the drawings in which:

FIG. 5 is a front view of the adjustable positioning mechanism shown in FIG. 1; the mobile member being locked at an angle.

FIG. 5A is a cross-sectional view of the adjustable positioning mechanism shown in FIG. 5, taken along the line B—B.

FIGS. 6A to 6C are cross-sectional views of an adjustable positioning mechanism illustrating an exemplary assembly sequence for a hermetic sealing with a spherical interface, according to a preferred embodiment of the present invention.

Figure 1:
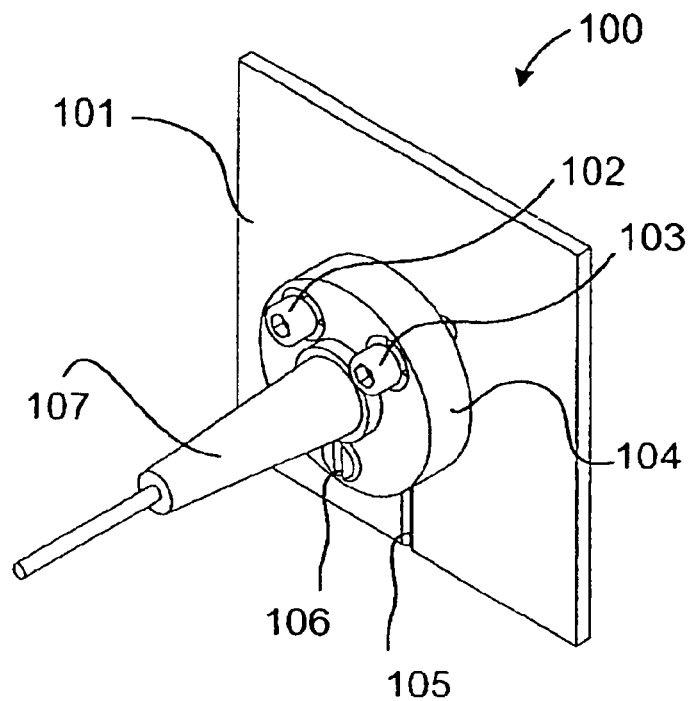
FIG. 1 is a perspective view of an adjustable positioning mechanism according to a preferred embodiment of the present invention.

While the invention will be described in conjunction with an example embodiment, it will be understood that it is not intended to limit the scope of the invention to such embodiment. On the contrary, it is intended to cover all alternatives, modifications and equivalents as may be included as defined by the appended claims.

DESCRIPTION OF A PREFERRED EMBODIMENT

In the following description, similar features in the drawings have been given similar reference numerals and in order to weight down the figures, some elements are not referred to in some figures if they were already identified in a precedent figure.

The present invention concerns an adjustable positioning mechanism particularly adapted for positioning an optical device, and accurately adjusting its position relatively to another optical device. Preferably, the present invention is intended to be used with small optical assemblies, such as, but not limited to, pigtailed collimators. In the following description, it is to be understood that any kind of optical element such as lenses, optical fibers or mirrors for non-limitative example can also advantageously be used.

Figure 2:
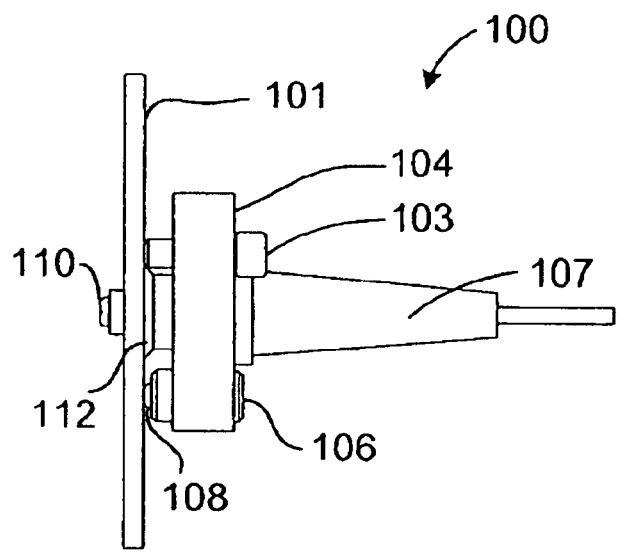
FIG. 2 is a side view of the adjustable positioning mechanism shown in FIG. 1.
Figure 3:
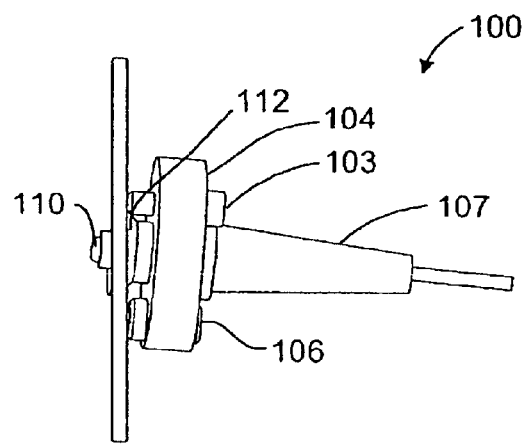
FIG. 3 is a side view of the adjustable positioning mechanism shown in FIG. 1; the mobile member being locked at an angle.
Figures 4, 4A:
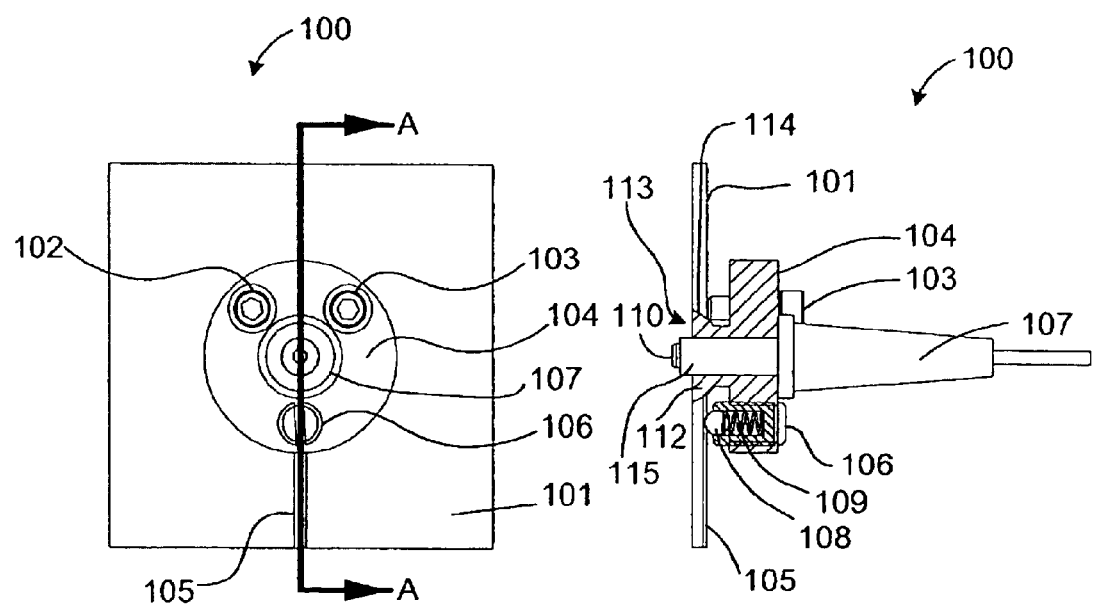
FIG. 4 is a front view of the adjustable positioning mechanism shown in FIG. 1.
FIG. 4A is a cross-sectional view of the adjustable positioning mechanism shown in FIG. 4, taken along the line A—A.

Referring to FIGS. 1, 2 and 4A, there is shown a first preferred embodiment of the adjustable positioning mechanism 100 of the present invention. The preferred embodiment shown includes a reference plate 101 and a mobile member 104 holding an optical element such as a pigtailed collimator 107. The reference plate 101 is provided with a predetermined shaped socket 113 providing a reference mating surface 114. The mobile member 104 is provided with a shaped mating portion 112 at least part of which is defined by a spherical surface adapted for fitting into the shaped socket 113 of the reference plate 101 and abutting against the reference mating surface 114, thereby providing a pivot type of joint between the reference plate 101 and the mobile member 104. It is to be understood that any shape for the socket 113 of the reference plate 101 providing a pivot type of joint between the reference plate 101 and the mobile member 104 could be conveniently used. Preferably, the shaped socket 113 of the reference plate 101 comprises a spherical portion matching the spherical surface of the mating portion 112 of the mobile member 104. In the illustrated embodiment, the shaped mating portion 112 of the mobile member 104 is a semi-spherical portion and the socket 113 of the reference plate 101 includes a semi-spherical mating portion 114, preferably placed on the side opposite to the mobile member 104, which exactly fits the semi-spherical portion 112 of the mobile member 104, and advantageously provides a support to the mobile member 104. Once the semi-spherical portion 112 of the mobile member 104 is installed into the reference plate socket 113, the mobile member 104 may rotate around a fixed point created by matching the 2 parts spherically, creating a ball and socket type of joint, as can be better seen in FIG. 4A. Preferably, as illustrated in FIGS. 1 to 5, the shaped socket 113 of the reference plate 101 is an opening and the mobile member 104 extends on both side of the reference plate 101. In this case, the mobile member 104 is advantageously provided with a longitudinal opening 115 for transmitting light therethrough.

The adjustable positioning mechanism 100 of the present invention is also provided with a deformable maintaining element 109 connected to the mobile member 104 acting against the reference plate 101 and adapted to rotatively hold the mobile member 104 and the reference plate 101 together in cooperation with the pivot type of joint. The adjustable positioning mechanism 100 is also provided with a releasable non-deformable securing element 106 connected to the mobile member 106 frictionally acting against the reference plate 101 for rigidly securing the mobile member 104 and the reference plate 101 together when the securing element 106 is in a locked position. Throughout the present description, by the expression "connected to", it should be understood that the maintaining element 109 and the securing element 106 interact with the mobile member 104 for holding and positioning the mobile member 104 relatively to the reference plate 101. For example, the maintaining element 109 and the securing element 106 may be attached on the mobile member 104, but any other conventional means could also be envisaged.

The adjustable positioning mechanism of the present invention is also provided with non-deformable tilt adjustment means connected to the mobile member 104 and pressing against the reference plate 101. The tilt adjustment means provides a controlled angular movement of the mobile member 104 relative to the reference plate 101 when the securing element 106 is in an unlocked position, as will be explained in more details thereinafter. Advantageously, the tilt adjustment means may cooperate with the maintaining element 109 for rotatively holding the mobile member 104 and the reference plate 101 together.

Referring again to FIGS. 1 to 4A, in a preferred embodiment, the tilt adjustment means preferably comprises a first and a second adjustment set screw 102, 103 extending through threaded holes of the mobile member 104. These two adjustment set screws 102, 103 are preferably fine pitch screws for providing a more accurate position adjustment of the optical element. These two adjustment set screws 102, 103 preferably act ninety-degrees spaced apart, relative to the center of rotation of the pivot type of joint, against the reference plate 101, thereby allowing a first and a second independently tuned tilt angle adjustment. Indeed, such orthogonal configuration allows to adjust the two tilt angles independently. However, it should be noted that others screw configurations may also be conveniently used to provide different patterns for the tilt adjustment means. The adjustment screws 102 and 103 contact and push against the surface of the reference plate 101 once they exit the respective threaded hole of the mobile member 104. They do not go through threaded holes in the reference plate 101 as it was the case in the prior art devices previously described. As illustrated, the mating surface 114 of the reference plate 101 preferably extends of a first side of the reference plate while the maintaining element, the securing element and the tilt adjustment means extend on a second side opposed to the first. Since the mobile member 104 is retained to the reference plate 101 by the pivot type of joint on one of the side of the reference plate 101, the force exerted by the screws 102, 103 on the opposed side may only result in the rotation of the mobile member 104.

Referring now to FIGS. 3 to 5, in a preferred embodiment of the present invention, releasable locking means made of the deformable maintaining element 109 and of the releasable securing element 106 advantageously comprise a spring loaded plunger set screw providing a constant force that will ensure that the contact between the two mating surfaces will be maintained during the adjustment without limiting the effect of the two adjustment screws 102, 103. The spring loaded plunger set screw has a body 106 pressing against the reference plate 101 in the locked position, and a spring operated friction element 108 pressing against the reference plate 101 in the unlocked position. Once the adjustment of the screws 102 and 103 is done, the spring loaded plunger set screw can be tightened to rigidly lock the assembly, as illustrated in FIGS. 5 and 5A, while keeping substantially the desired alignment. When the plunger is tightened to its maximum position, the body 106 of the plunger is directly in contact with the reference surface 101 and effectively eliminates the influence of the spring 109 on the alignment. This prevents any movement that might occur from spring fatigue or resilient material, or the influence of an external force.

In a further preferred embodiment of the present invention, the spring operated friction element 108 slidably acts against the reference plate 101 in a shaped groove 105 extending therein and adapted for confining a rotation of the mobile member 104. In another further embodiment, the spring operated friction element 108 is a ball and the shaped groove 105 is V-shaped. Indeed, during the adjustment, the movement of the ball 108 of the spring loaded plunger is confined in the V-shaped groove 105, thereby preventing the mobile member 104 from rotating, in the plan defined by the main surface of the reference plate 101. It should be understood that the spring plunger can be replaced by a combination of deformable means, such as resilient material or spring assembly, and a locking screw. It should also be noted that the present invention covers the configurations where it would be desirable to have different geometries for the groove-spring operated friction element interface. For example, in another preferred embodiment which is not illustrated, the spring operated friction element 108 may be cylindrically shaped. In this preferred embodiment, the cylindrical friction element 108 longitudinally extends in the groove 105 having a cylindrical shape for confining the rotation of the mobile member 104 to a single rotation axis, thereby providing only 1 degree of freedom in rotation.

In another preferred embodiment, it would be desirable that the optical element has an optical axis co-incident with the centre of rotation of the pivot type of joint. More preferably, it would be desirable that the optical element has a focal point co-incident with the centre of rotation of the pivot type of joint. Indeed, by securing the optics 107 properly in the mobile member 104, it is possible to match the focal point of a lens 110 fixed on the mobile member 104 or a reference surface of any other device with the centre of rotation of the pivot type of joint. This way, pure tilt movement can be achieved. On the other hand, not matching the focal point with the rotation center could be deliberately used to couple an X-Y displacement along with the tilt. The optical component may be fixed in the opening of the mobile member 104 by using a set screw that extends through a threaded aperture (not shown) or by any other conventional means such as epoxy bonding, reflow soldering, welding, etc as well known in the art.

Figure 7A:
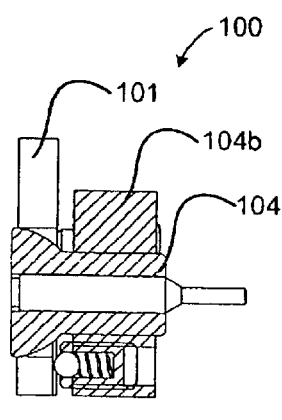
FIGS. 7A to 7C are cross-sectional views of another adjustable positioning mechanism illustrating an exemplary assembly sequence for a hermetic sealing with a circular interface, according to another preferred embodiment of the present invention.
Figure 7B:
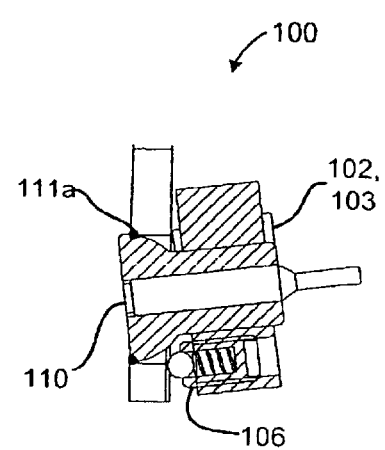
Figure 7C:
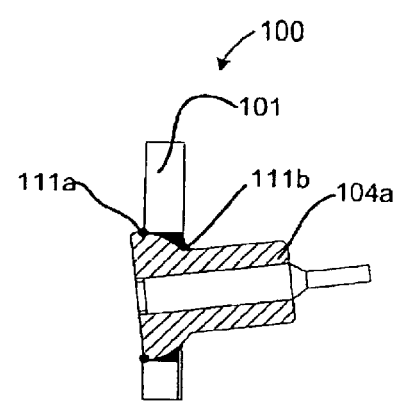

As noted above, it should also be understood that the present invention covers the configurations where it would be desirable to have different geometries for the matching mating interfaces of the reference plate 101 and the mobile member 104, such as a spherical/straight mating interface, that would provide a circular interface instead of a spherical one. FIG. 7 illustrates an example of this latter case. In this preferred embodiment, the reference plate socket 113 is a cylindrical one. In this illustrated embodiment, the reference plate socket 113 is a cylindrical opening but it should be noted that the present invention also covers the case where the socket 113 is not opened on both sides of the reference plate 101. The cylindrical socket 113 has to be diametrically smaller than the spherical surface 112 of the mobile member for allowing a convenient mating of the mobile member 104 with the reference plate 101. Such a set-up simplifies the fabrication process but limits the contact between the mobile member 104 and the reference plate 101 to a single line 111a on one side only.

Referring again to FIG. 4A, obviously, the semi-spherical portion 112 cannot be installed into its socket 113 from the mobile member side of the reference plate 101, in this particular embodiment. Many methods could be used to install the mobile member 104 on the reference plate 101. One possibility is that the reference plate 101 can be slotted down to the socket 113 to allow passage of the narrow neck between the mating portion 112 and the main body of the mobile member 104. The reference plate 101 could also be made of a first and a second parts assembled around the mating portion 112 of the mobile member 104. If hermeticity has to be maintained, as it will be further detailed, another solution consists in making the mobile member 104 of 2 separate parts, a central element 104a and an outer ring 104b as illustrated in FIGS. 6A through 6C. The central element 104a could be installed from the socket-side to the outer ring 104b of the mobile member 104 through the opening in the centre of the socket 113. The central element 104a may be fixed in the outer ring 104b by using a screw that extends radially through a threaded aperture (not shown), by using a threaded central hollow, or by any other conventional means. Preferably, the central element 104a is removably fixed in the outer ring 104b. More preferably, the maintaining element, the securing element and the adjustment means are connected to the outer ring 104b.

Once the assembly is adjusted as described above, the mobile member 104 can be bonded permanently to the reference plate 101, which could be for example an optoelectronic module wall. For this purpose, the adjustable positioning mechanism 100 of the present invention is advantageously further provided with sealing means for hermetically sealing the reference plate 101 and the mobile member 104 together. Thus, the assembly can be secured using sealing means such as, but not limited to, epoxy bonding, welding or reflow soldering; thereby achieving a true hermetic seal. The technologies to effectively seal optical fiber or optical elements within a metallic housing are well known in the art and will not be exposed herein.

According to another preferred embodiment of the present invention, FIGS. 6 and 7 refer to a situation where it would be desirable to have the assembly secured permanently in a manufacturing perspective. In this embodiment, the mobile member 104 can be made of the 2 separate parts 104a and 104b described above. The central element 104a may be fixed in the outer ring 104b in such a way that the outer ring 104a is preferably removable. The sequence shown in FIG. 6 details how the assembly can be made. FIG. 6A) illustrates the assembled central element 104a and outer ring 104b before alignment. Once the alignment is done, the central element 104a can be attached to the reference plate 101 by tacking both components in place around the circumference of their junction 111a, as illustrated in FIG. 6B). Once the fixation is done, the outer ring 104b in FIG. 6C) is disassembled and the central element 104a sealed along the unique seam linking the inside of the package to the external environment. This method would advantageously allow the use of the outer ring 104b as an assembly tool. It is obvious that in the latter case, the outer ring 104b acts as a manipulator and could be replaced by a more precise mechanical system, automated or not, such as, but not limited to, a robotic manipulator for example.

Referring again to FIG. 7, in the case of a particular geometry of the matching interface, additional sealing from the exterior of the package could also be done by filling the resulting void space by glue or solder 111b.

Figure 8:
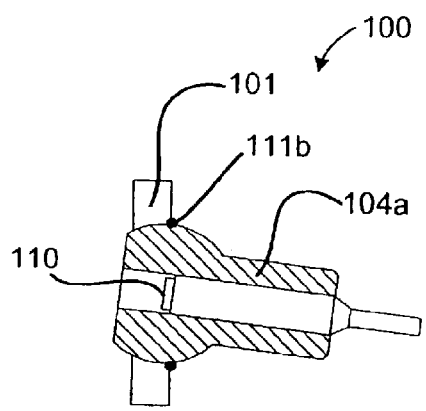
FIG. 8 is a cross-sectional view of another adjustable positioning mechanism according to another hermetically sealed embodiment of the present invention.

According to another preferred embodiment of the present invention, FIG. 8 refers to a situation where a manipulator is exclusively used to align the central element 104a and that no screw-operated alignment is necessary. In that case, the spherical socket 113 of the reference plate 101 could be fabricated on the same side as the one the central element 104a is installed from. The manipulator can hold the central element 104a in place while its position is adjusted. The central element 104a can then be tacked into place at the junction 111b, and the manipulator can then be removed. Using this method, all the installation and fixation process can be done from the outside of a package.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. An adjustable positioning mechanism for positioning an optical element relatively to a second element, said mechanism comprising:

a reference plate having a predetermined shaped socket providing a reference mating surface;

a mobile member for holding said optical element, said mobile member having a shaped mating portion at least part of which is defined by a spherical surface adapted for fitting into said shaped socket of said reference plate and abutting against said reference mating surface, thereby providing a pivot type of joint between said reference plate and said mobile member;

a deformable maintaining element connected to said mobile member acting against said reference plate and adapted to rotatively hold said mobile member and said reference plate together in cooperation with said pivot type of joint;

a releasable non-deformable securing element connected to said mobile member frictionally acting against said reference plate for rigidly securing said mobile member and said reference plate together when said securing element is in a locked position; and non-deformable tilt adjustment means connected to the mobile member and pressing against the reference plate, said tilt adjustment means providing a controlled angular movement of the mobile member relative to the reference plate when the securing element is in an unlocked position.

2. The adjustable positioning mechanism according to claim 1, wherein said reference mating surface comprises a spherical supporting portion.

3. The adjustable positioning mechanism according to claim 1, wherein said shaped socket of said reference plate is a cylindrical socket diametrically smaller than said spherical surface of said mobile member.

4. The adjustable positioning mechanism according to claim 1, wherein said shaped socket of said reference plate is an opening, the mobile member extending through said reference plate.

5. The adjustable positioning mechanism according to claim 4, wherein said mobile member has a longitudinal opening for transmitting light therethrough.

6. The adjustable positioning mechanism according to claim 4, wherein said reference plate has a first side and a second side opposed thereto, said mating surface of said reference plate extending on said first side while said maintaining element, said securing element and said tilt adjustment means extend on said second side.

7. The adjustable positioning mechanism according to claim 1, wherein said optical element has an optical axis co-incident with a center of rotation of said pivot type of joint.

8. The adjustable positioning mechanism according to claim 1, wherein said optical element has a focal point co-incident with a center of rotation of said pivot type of joint.

9. The adjustable positioning mechanism according to claim 1, wherein said securing element comprises a body of a spring loaded plunger set screw pressing against the reference plate in said locked position, said maintaining element comprising a spring operated friction element of said spring loaded plunger set screw pressing against said reference plate in said unlocked position.

10. The adjustable positioning mechanism according to claim 9, wherein said spring operated friction element slidably acts against said reference plate in a shaped groove extending therein adapted for confining a rotation of said mobile member.

11. The adjustable positioning mechanism according to claim 10, wherein said spring operated friction element is a ball, said groove being V-shaped and adapted for preventing said mobile member from rotating in a plan defined by a main surface of said reference plate.

12. The adjustable positioning mechanism according to claim 10, wherein said spring operated friction element is cylindrically shaped and longitudinally extends in said groove having a cylindrical shape for confining said rotation of said mobile member to a single rotation.

13. The adjustable positioning mechanism according to claim 1, wherein said tilt adjustment means comprise a first and a second adjustment set screw extending though threaded holes of the mobile member and acting ninety-degrees spaced apart against said reference plate, thereby allowing a first and a second independently tuned tilt angle adjustment.

14. The adjustable positioning mechanism according to claim 1, further comprising sealing means for hermetically sealing said reference plate and said mobile member together when said securing element is in said locked position.

15. The adjustable positioning mechanism according to claim 14, wherein said securing element and said maintaining element are removable.

16. The adjustable positioning mechanism according to claim 14, wherein said tilt adjustment means are removable.

17. The adjustable positioning mechanism according to claim 14, wherein said sealing means comprise an epoxy bonding.

18. The adjustable positioning mechanism according to claim 14, wherein said sealing means comprise a welding.

19. The adjustable positioning mechanism according to claim 14, wherein said sealing means comprise a reflow soldering.

20. The adjustable positioning mechanism according to claim 1, wherein said reference plate is slotted down to the socket for allowing a mounting of the mobile member with the reference plate.

21. The adjustable positioning mechanism according to claim 1, wherein said reference plate comprises a first and a second part assembled around the mating portion of said mobile member.

22. The adjustable positioning mechanism according to claim 1, wherein said mobile member comprises a central element and an outer ring removably fixed to the central element, said maintaining element, said securing element and said tilt adjustment means being connected to the outer ring.

* * * * *